United States Patent
Breuer et al.

(10) Patent No.: US 9,742,493 B2
(45) Date of Patent: Aug. 22, 2017

(54) RECONSTRUCTING LIGHT-BASED COMMUNICATION SIGNALS CAPTURED WITH A ROLLING SHUTTER IMAGE CAPTURE DEVICE

(71) Applicants: Christian Breuer, Newburyport, MA (US); Anant Aggarwal, Waltham, MA (US); Barry Stout, Beverly, MA (US)

(72) Inventors: Christian Breuer, Newburyport, MA (US); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/870,055

(22) Filed: Sep. 30, 2015

(65) Prior Publication Data
US 2017/0093489 A1     Mar. 30, 2017

(51) Int. Cl.
| H04B 10/00 | (2013.01) |
| H04B 10/116 | (2013.01) |
| H04N 5/353 | (2011.01) |
| H04B 10/54 | (2013.01) |
| H04B 10/67 | (2013.01) |

(52) U.S. Cl.
CPC ........... H04B 10/116 (2013.01); H04B 10/54 (2013.01); H04B 10/67 (2013.01); H04N 5/3532 (2013.01)

(58) Field of Classification Search
CPC ...... H04B 10/116; H04B 10/67; H04B 10/54; H04N 5/3532
See application file for complete search history.

(56) References Cited

U.S. PATENT DOCUMENTS

| 2005/0281549 A1* | 12/2005 | Shih | G03B 7/08 396/57 |
| 2008/0265799 A1* | 10/2008 | Sibert | H05B 37/0245 315/292 |
| 2008/0310850 A1* | 12/2008 | Pederson | G07C 9/00158 398/135 |
| 2012/0200226 A1* | 8/2012 | Knibbe | H04B 10/1149 315/151 |
| 2014/0045549 A1* | 2/2014 | Ryan | H04N 5/3532 455/556.1 |
| 2014/0105601 A1* | 4/2014 | Ooki | H04Q 11/0005 398/48 |
| 2014/0186049 A1* | 7/2014 | Oshima | H04B 10/1143 398/118 |
| 2014/0186052 A1* | 7/2014 | Oshima | H04B 10/1143 398/130 |
| 2014/0265878 A1* | 9/2014 | Gritti | H04B 10/116 315/153 |

(Continued)

*Primary Examiner* — Danny Leung
(74) *Attorney, Agent, or Firm* — Yutian Ling

(57) ABSTRACT

Methods and systems are described for sampling an LCOM message and accurately reconstructing the entire LCOM message using a light receiver (e.g., digital camera) of a typical mobile computing device, such as a smartphone, tablet, or other mobile computing device. These including receiving segments of an LCOM signal from at least two repetitions of the LCOM signal. The location of each segment within the LCOM signal is identified and each segment is stored in a corresponding location in a buffer configured to have a length equal to the LCOM signal. The buffer is a ring buffer, in some embodiments.

12 Claims, 9 Drawing Sheets

(56) References Cited

U.S. PATENT DOCUMENTS

| | | | |
|---|---|---|---|
| 2014/0375217 A1* | 12/2014 | Feri | H05B 37/0272 |
| | | | 315/151 |
| 2015/0280822 A1* | 10/2015 | Breuer | H04B 10/116 |
| | | | 398/130 |
| 2015/0280823 A1* | 10/2015 | Breuer | H04B 10/1149 |
| | | | 398/25 |
| 2015/0280829 A1* | 10/2015 | Breuer | G01C 3/32 |
| | | | 398/118 |
| 2015/0281905 A1* | 10/2015 | Breuer | H04W 4/026 |
| | | | 398/118 |
| 2015/0282282 A1* | 10/2015 | Breuer | H05B 37/0272 |
| | | | 315/152 |
| 2016/0164603 A1* | 6/2016 | De Bruijn | H05B 37/0272 |
| | | | 398/118 |

\* cited by examiner

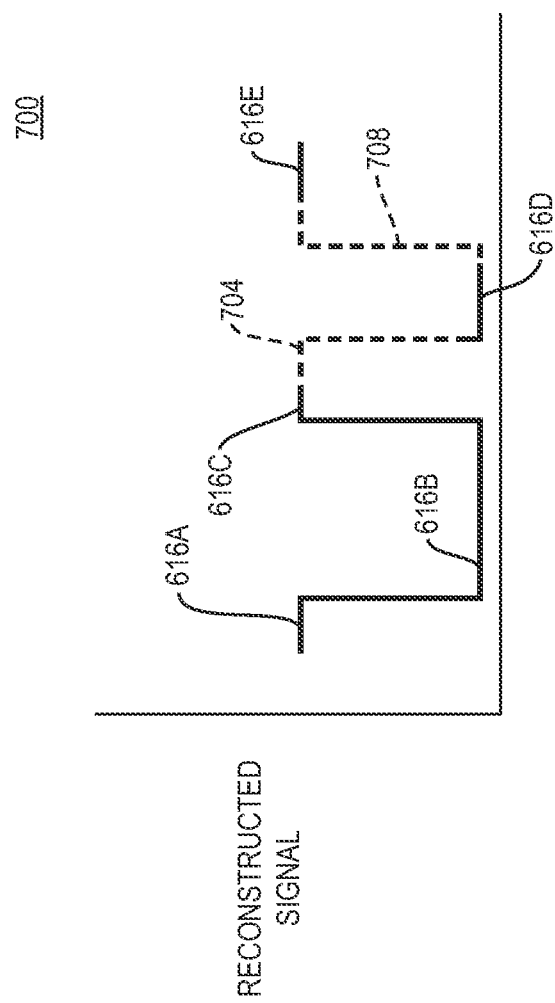

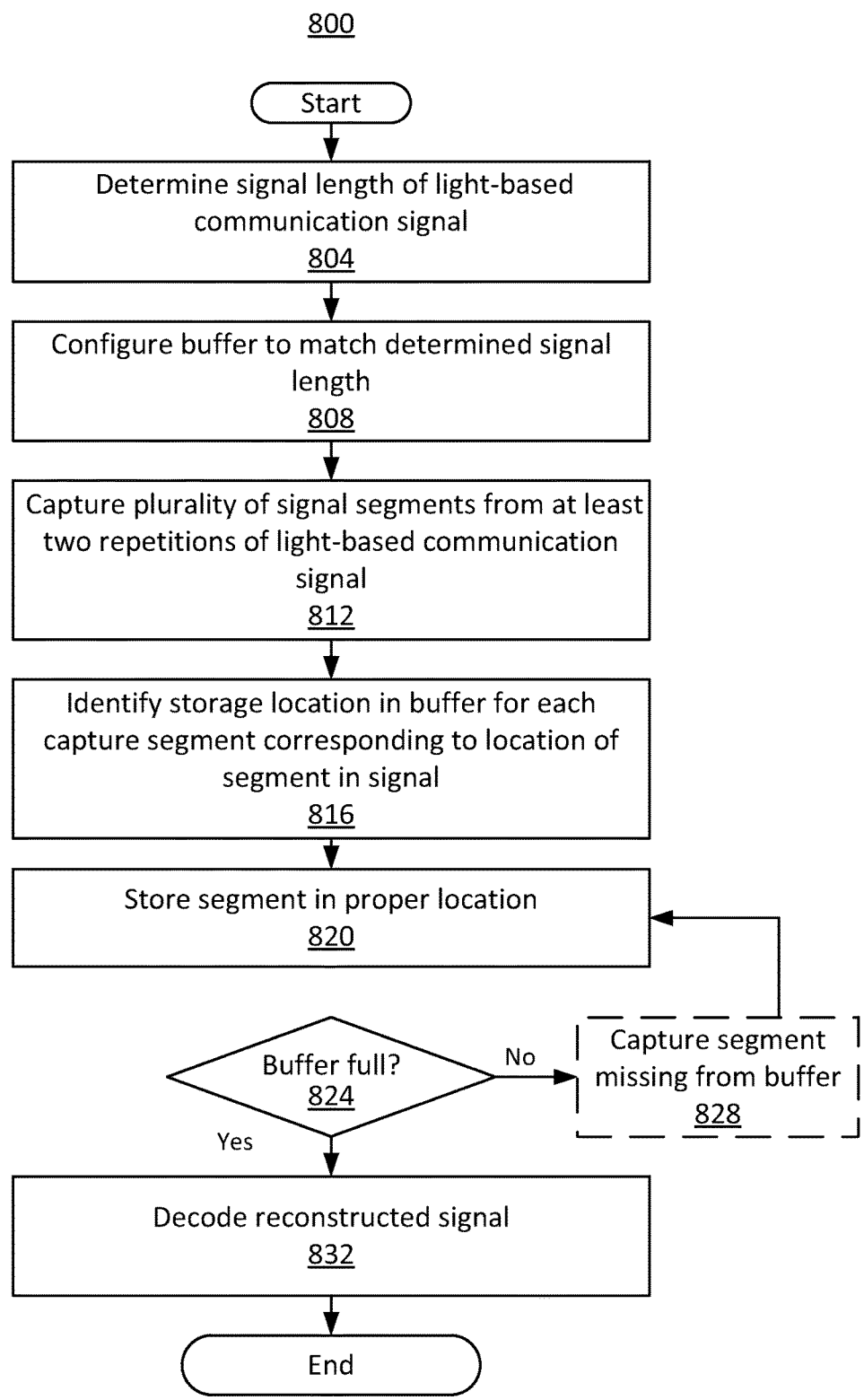

RECONSTRUCTING LIGHT-BASED COMMUNICATION SIGNALS CAPTURED WITH A ROLLING SHUTTER IMAGE CAPTURE DEVICE

TECHNICAL FIELD

The present disclosure relates generally to receiving and transmitting communications signals using solid-state lighting (SSL). Specifically, the present disclosure relates to reconstructing light-based communication signals using a rolling shutter image capture device.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access. GPS and Wi-Fi systems, alone or in combination, can be used to provide navigational instructions to a user in possession of a receiver configured for decoding one or more of these types of signals.

However, GPS and Wi-Fi signals are not adequate in all situations. In some cases, GPS and Wi-Fi signals are not precise or accurate enough. In other cases, a user may be in a location where the signals are absent. For example, the concrete and metal structure of a parking garage may attenuate GPS and Wi-Fi signals, leaving the receiver of the user without processable location or navigational signals. In these cases, an alternative or supplemental technology would be helpful for providing location and navigational information to a user.

BRIEF DESCRIPTION OF THE DRAWINGS

FIG. 7 schematically illustrates reconstructing an LCOM signal using captured segments stored in a ring buffer configured to have a same length as the LCOM signal, in an embodiment.

FIG. 8 is a method flow diagram of a method for reconstructing light-based communication signals captured, in an embodiment.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Light-based communications ("LCOM") systems are used for providing navigation and positioning information to a user. The LCOM signals are decoded with a still-image camera, video camera, and/or light sensor (referred to herein collectively as a "light receiver" for convenience) of a mobile computing device. However, typical light receivers of a mobile computing device sample signals at a slower rate than the transmission frequency of LCOM signals. For example, a typical camera on a mobile computing device such as a smartphone can capture about 10 unique samples per second using a "rolling shutter" and about 120 samples per second using a "global shutter." A light sensor on a mobile computing device samples light intensity data at about 300 samples per second. However, these example sampling rates may be inadequate for collecting sufficient data to accurately reconstruct an LCOM signal.

Accurate signal reconstruction is conventionally thought to require sampling the transmitted signal at twice the signal frequency, or equivalently sampling at a period half the wave period of the message signal. These equivalent sampling criteria are known as the "Nyquist rate" and "Nyquist period," respectively. When these criteria are applied to LCOM signals, which often have a transmission frequency of about 200 Hz to 300 Hz (i.e., beyond the ability of a human eye to see variations in the light intensity or "flickering"), the minimum sampling criterion of 600 samples per second or equivalently a sampling period of 3.3 milliseconds. Thus, the Nyquist rate is far higher than the sampling rates of typical light receivers of mobile computing devices. This presents a technical challenge when using a light receiver of a mobile communications device for receiving an LCOM message signal and decoding the LCOM signal accurately so that the message is provided to the user.

Figure 1A:
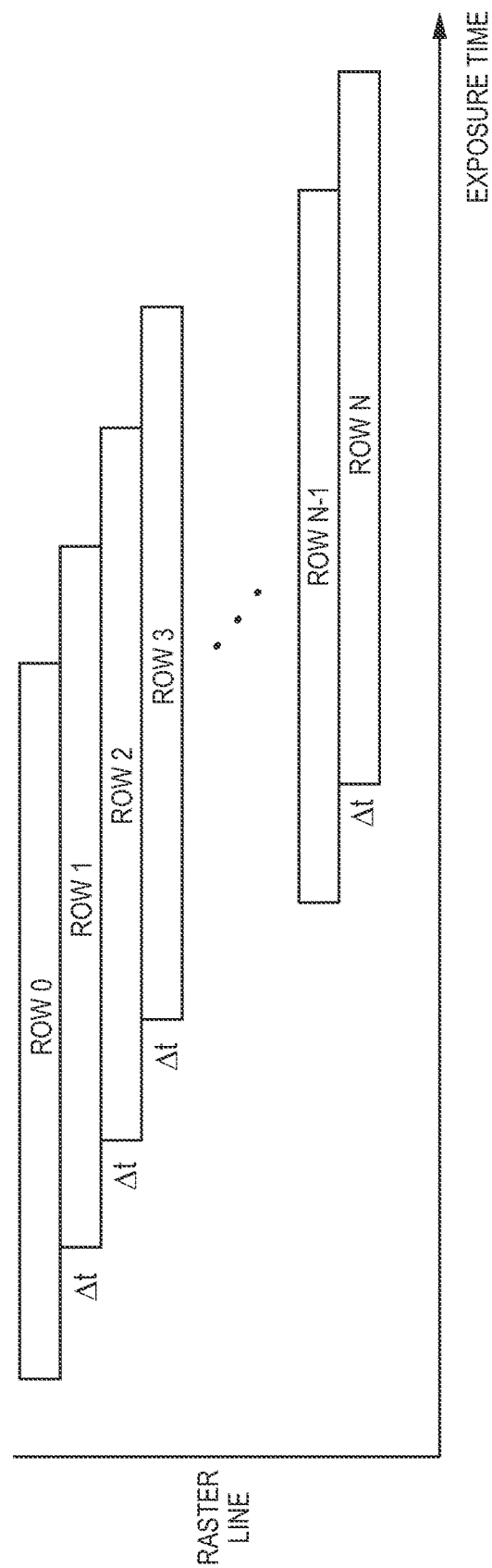
FIG. 1A schematically illustrates a rolling shutter capture scheme of the prior art, in an embodiment.

This challenge is particularly notable when using a rolling shutter image capture device of a mobile communications device. This rolling shutter method is schematically illustrated in FIG. 1A. As shown, each row of sensor pixels (known as a "raster line") in a sensor of an image capture device (e.g., a still-image camera of a mobile computing device) records light intensity data from a light source. The light intensity data recorded within each raster line corresponds to a same moment in time but different spatial locations of the light source. For illustration purposes only, assuming a luminaire corresponds exactly to a field of view of an image sensor, one raster line corresponds to a line of light intensity from one edge of the luminaire to an opposing edge of the luminaire at the instant the sensor pixels of that raster line captured the light intensity data. Most LCOM decoding schemes average the light intensity values for each sensor pixel in a raster line to a single value. This single value is then used in the decoding of the signal.

One deficiency of the rolling shutter scheme is that it reduces the number of independent data points captured from the LCOM enabled luminaire. As shown in FIG. 1A, each raster line of the image sensor begins its image capture after a slight time delay Δt relative to the preceding adjacent raster line. Because the time delay Δt is less than the length of time for a raster line to complete its image data capture, many of the raster lines capture at least some of the light intensity data from the LCOM enabled luminaire at the same time. As a result, each of these "overlapping" raster lines includes at least some of the same light intensity data. This has the effect of reducing the sampling rate of rolling shutter image capture devices. For example, if 100 raster lines overlap at any given time, the number of unique samples of light intensity data captured during a frame is the number of total raster lines in the frame divided by 100. That is, a typical camera in a mobile computing device with 720 raster lines per frame only receives 7.2 unique samples per frame because 100 raster lines overlap and therefore include some of the same light intensity data.

Reducing the number of samples by using a rolling shutter scheme is problematic for at least the reason that it reduces the number of samples captured by an image capture device far below the Nyquist rate needed for accurate signal decoding. For example, the Nyquist sampling rate of a typical 32 bit LCOM message signal would preferably have 64 samples captured for accurate decoding. For this reason, using a rolling shutter capture scheme that, given current image capture device configurations, captures on the order of 10 unique samples complicates the receipt and accurate decoding of an LCOM signal.

To overcome this technical challenge, embodiments of the present disclosure disclose methods and systems for sampling an LCOM message signal at a rate less than the Nyquist rate and accurately reconstructing the entire LCOM message using a light receiver of a given mobile communication device. Some embodiments herein utilize alias frequency sampling techniques as described in U.S. patent application Ser. No. 14/870,445, entitled "Reconstructing Light-Based Communication Signals using an alias frequency" and filed Sept. 30, 2015, which is herein incorporated by reference in its entirety, to receive segments of an LCOM signal from at least two repetitions of the signal at a sample frequency less than the Nyquist rate. The location of each segment within the LCOM signal is identified and each segment is stored in a corresponding location in a buffer configured to have a length equal to the LCOM signal. In some embodiments, this buffer is a ring buffer, but other suitable buffer architectures can be used, as will be appreciated.

The term "location" is used for convenience only and encompasses any convenient method for identifying a capture location between a start and an end of a waveform of a signal. For example, "location" can refer to an elapsed time between the start and end of the signal in which the start time is assigned an origin value. "Location" can also refer to a timestamp based on a clock accessible by the mobile computing device and synchronized with the LCOM signal or transmitted in metadata by the LCOM signal.

Prior to describing embodiments of the present disclosure, the technological context for LCOM technology is illustrated in FIGS. 1-4, each of which is described as follows. As used herein, light-based communication (LCOM) generally refers to communication between an LCOM enabled solid-state luminaire and a receiver device, such as a mobile computing device having a digital camera or other sensor capable of detecting LCOM signals. The LCOM enabled luminaire emits a signal using pulsing light encoded with data. A signal, as used herein, corresponds to one complete waveform while the term "repetition" refers to signals having the same waveform that are repeated by the LCOM enabled luminaire.

In general, the light utilized in LCOM may be of any spectral band, visible or otherwise, and may be of any intensity, as desired for a given target application or end-use. In accordance with some embodiments, in an LCOM system, a given LCOM enabled luminaire may be configured to transmit a pulsing light signal encoded with data (an LCOM signal), and a given receiver device, such as a mobile computing device, may be configured to detect the pulsing light signal encoded with data via one or more light-sensing devices, such as the still-image camera, the video camera, and/or the ambient light sensor mentioned above, among others. As will be appreciated, many digital camera devices available in mobile computing devices are capable of operating as both still and video cameras.

As will be appreciated in light of this disclosure, techniques disclosed herein can be utilized in any of a wide range of LCOM applications and contexts. For example, techniques disclosed herein can be utilized, in accordance with some embodiments, in transmitting location and positioning information between an LCOM enabled luminaire and a light receiver. This information may be utilized, in part or in whole, to provide for indoor navigation, in accordance with some embodiments. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for commercial endeavors not possible with existing GPS-based and Wi-Fi-based approaches. More particularly, while the limited accuracy of existing GPS-based and Wi-Fi-based approaches is not sufficient for directing a customer to an item of interest on a shelf within a retail store, techniques disclosed herein can be utilized, in accordance with some embodiments, to lead customers directly to in-store promotions and other on-shelf items, as desired. Numerous configurations and variations will be apparent in light of this disclosure.

LCOM System Architecture

Figure 1B:
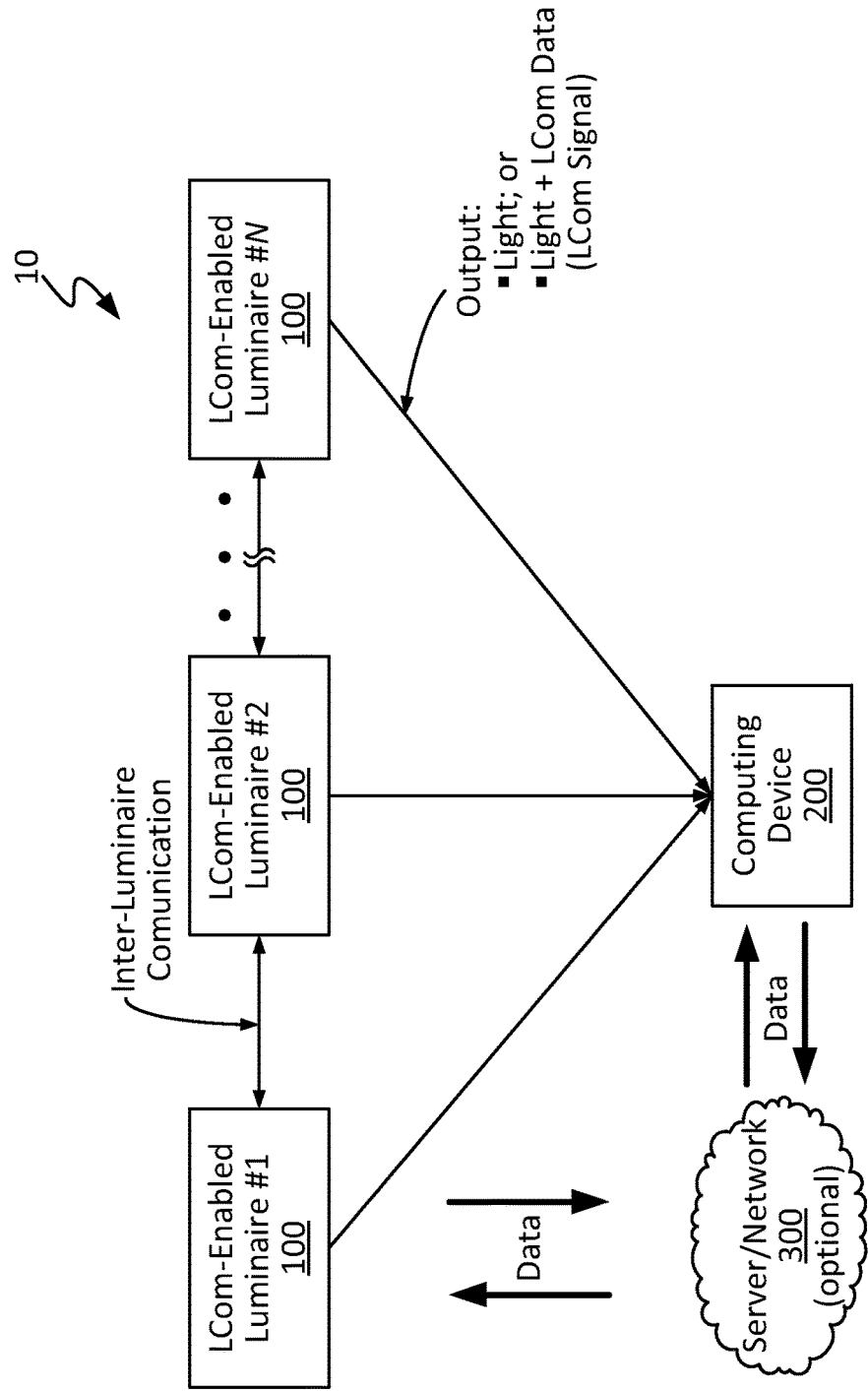
FIG. 1B is a block diagram illustrating an example light-based communication (LCOM) network, in an embodiment.

FIG. 1 is a block diagram illustrating an example light-based communication (LCOM) system 10 configured in accordance with an embodiment of the present disclosure. As can be seen, system 10 may include one or more LCOM enabled luminaries 100 configured for light-based communicative coupling with a receiver computing device 200 via LCOM signal(s). As described herein, LCOM signals are provided, in accordance with some embodiments, via visible light-based signals. In some cases, LCOM may be provided in only one direction; for instance, LCOM data may be passed from a given LCOM enabled luminaire 100 (e.g., the transmitter) to a computing device 200 (e.g., the receiver), or from a computing device 200 (e.g., the transmitter) to a given LCOM enabled luminaire 100 (e.g., the receiver). In some other cases, LCOM may be provided in both or multiple directions; for instance, LCOM data may be passed between a given LCOM enabled luminaire 100 and a computing device 200, where both act in a transmitting and receiving (e.g., transceiver) capacity. In some cases in which system 10 includes a plurality of LCOM enabled luminaries 100, all (or some sub-set) of thereof may be configured for communicative coupling with one another (e.g., inter-luminaire communication). In accordance with some embodiments, system 10 optionally may include or otherwise be configured for communicative coupling, for example, with a server/network 300 (discussed below). Communicative coupling may be provided, for example, between server/network 300 and computing device 200 and/or one or more LCOM enabled luminaries 100, as desired.

Figure 2A:
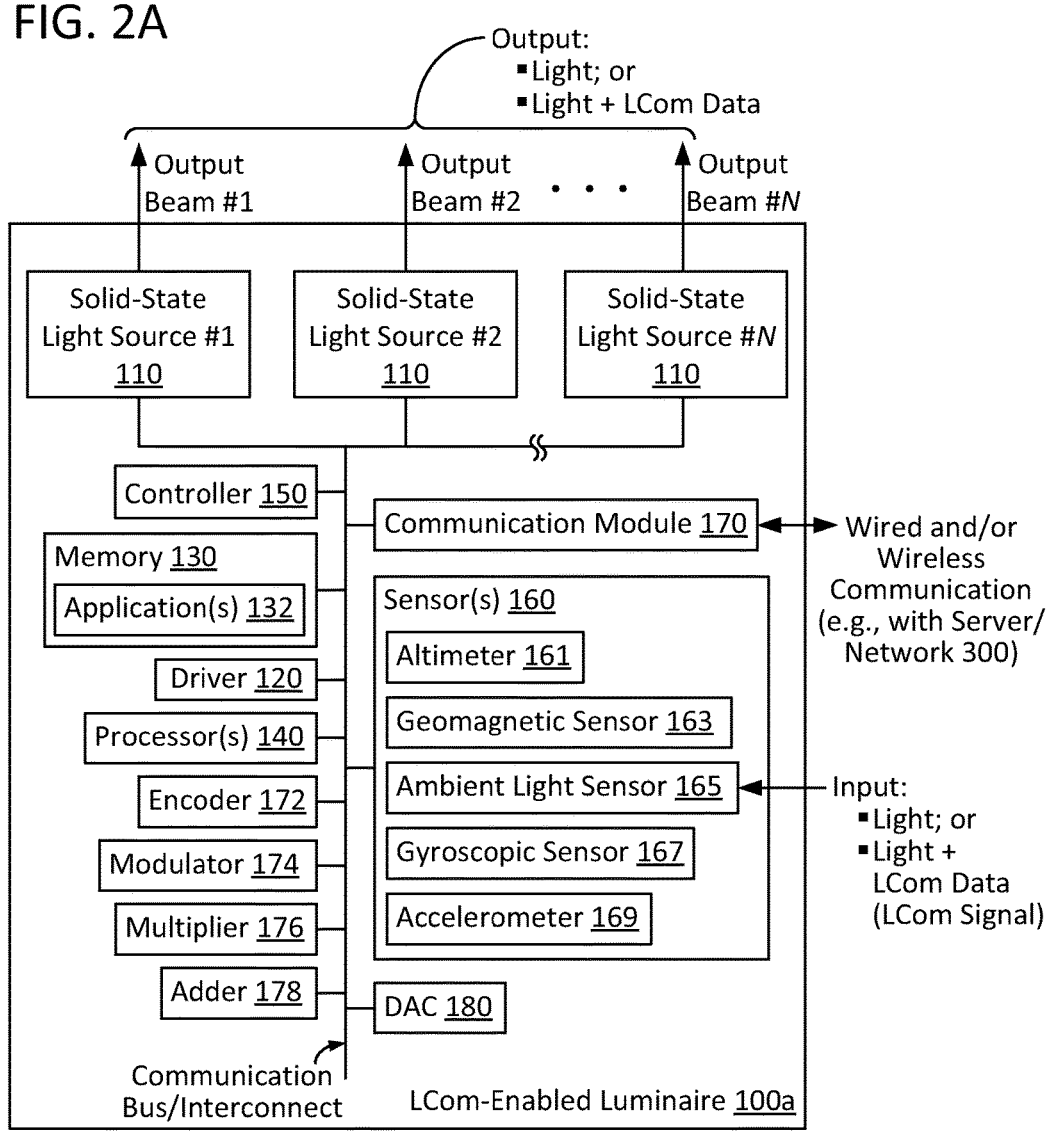
FIG. 2A is a block diagram illustrating an LCOM enabled luminaire, in an embodiment.
Figure 2B:
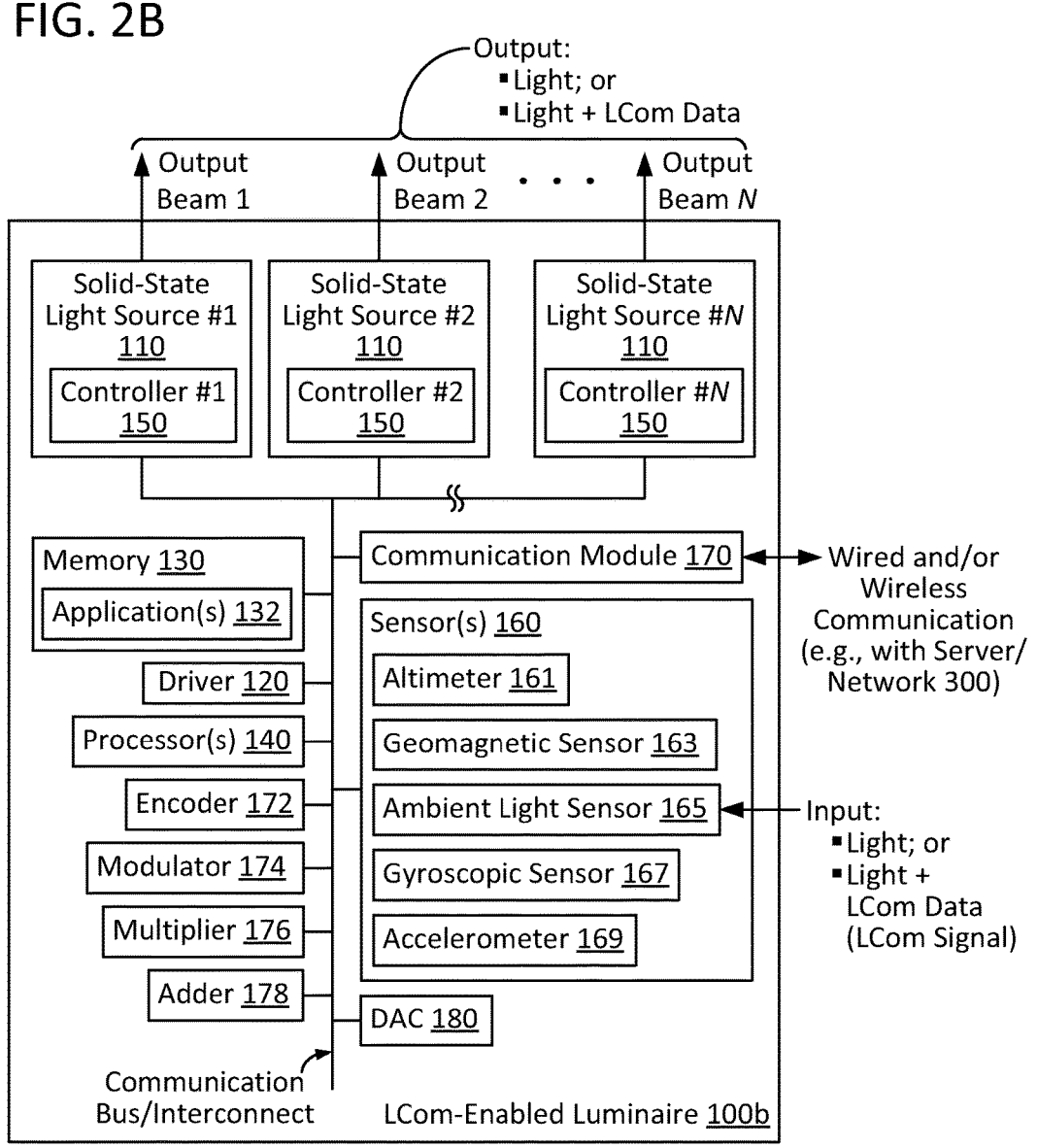
FIG. 2B is a block diagram illustrating an LCOM enabled luminaire, in an embodiment.

FIG. 2A is a block diagram illustrating an LCOM enabled luminaire 100*a* configured in accordance with an embodiment of the present disclosure. FIG. 2B is a block diagram illustrating an LCOM enabled luminaire 100*b* configured in accordance with another embodiment of the present disclosure. For consistency and ease of understanding of the present disclosure, LCOM enabled luminaries 100*a* and 100*b* hereinafter may be collectively referred to generally as an LCOM enabled luminaire 100, except where separately referenced.

As can be seen, a given LCOM enabled luminaire 100 may include one or more solid-state light sources 110, in accordance with some embodiments. The quantity, density, and arrangement of solid-state light sources 110 utilized in a given LCOM enabled luminaire 100 may be customized, as desired for a given target application or end-use. A given solid-state light source 110 may include one or more solid-state emitters, which may be any of a wide range of semiconductor light source devices, such as, for example: (1) a light-emitting diode (LED); (2) an organic light-emitting diode (OLED); (3) a polymer light-emitting diode (PLED); and/or (4) a combination of any one or more thereof. A given solid-state emitter may be configured to emit electromagnetic radiation (e.g., light), for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness semiconductor light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate, as will be apparent in light of this disclosure. In some cases, power and/or control connections for a given solid-state emitter may be routed from a given PCB to a driver 120 (discussed below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted therethrough. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCOM enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCOM enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be seen from FIGS. 2A-2B, a given LCOM enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCOM enabled luminaire 100 and one or more of the modules thereof (e.g., within memory 130 or elsewhere). In some cases, memory 130 may be configured to be utilized, for example, for processor workspace (e.g., for one or more processors 140) and/or to store media, programs, applications, and/or content on a host LCOM enabled luminaire 100 on a temporary or permanent basis.

The one or more modules stored in memory 130 can be accessed and executed, for example, by the one or more processors 140 of a given LCOM enabled luminaire 100. In accordance with some embodiments, a given module of memory 130 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 130 can be encoded, for example, on a machine-readable medium that, when executed by a processor 140, carries out the functionality of a given LCOM enabled luminaire 100, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 130 (e.g., one or more applications 132, discussed below) can be implemented in hardware, software, and/or firmware, as desired for a given target application or end-use.

In accordance with some embodiments, memory 130 may have stored therein (or otherwise have access to) one or more applications 132. In some instances, a given LCOM enabled luminaire 100 may be configured to receive input, for example, via one or more applications 132 stored in memory 130 (e.g., such as a lighting pattern, LCOM data, etc.). Other suitable modules, applications, and data which may be stored in memory 130 (or may be otherwise accessible to a given LCOM enabled luminaire 100) will depend on a given application and will be apparent in light of this disclosure.

In accordance with some embodiments, the one or more solid-state light sources 110 of a given LCOM enabled luminaire 100 can be electronically controlled, for example, to output light and/or light encoded with LCOM data (e.g., an LCOM signal). To that end, a given LCOM enabled luminaire 100 may include or otherwise be communicatively coupled with one or more controllers 150, in accordance with some embodiments. In some embodiments, such as that illustrated in FIG. 2A, a controller 150 may be hosted by a given LCOM enabled luminaire 100 and operatively coupled (e.g., via a communication bus/interconnect) with the one or more solid-state light sources 110 (1-N) of that LCOM enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface, optional server/network 300, etc.). As a result, a given LCOM enabled luminaire 100 may be controlled in such a manner as to output any number of output beams (1-N), which may include light and/or LCOM data (e.g., an LCOM signal), as desired for a given target application or end-use.

However, the present disclosure is not so limited. For example, in some other embodiments, such as that illustrated in FIG. 2B, a controller 150 may be hosted, in part or in whole, by a given solid-state light source 110 of a given LCOM enabled luminaire 100 and operatively coupled (e.g., via a communication bus/interconnect) with the one or more solid-state light sources 110. If LCOM enabled luminaire 100 includes a plurality of such solid-state light sources 110 hosting their own controllers 150, then each such controller 150 may be considered, in a sense, a mini-controller, providing LCOM enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCOM enabled luminaire 100 and may do so, for example, based on wired and/or wireless input received from a given local source (e.g., such as on-board memory 130) and/or remote source (e.g., such as a control interface, optional server/network 300, etc.). As a result, LCOM enabled luminaire 110 may be controlled in such a manner as to output any number of output beams (1-N), which may include light and/or LCOM data (e.g., an LCOM signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCOM data for transmission by a given LCOM enabled luminaire 100. In some embodiments, controller 150 may be configured to output a control signal to modulator 174 (discussed below) to facilitate modulation of an LCOM signal for transmission by a given LCOM enabled luminaire 100. Other suitable configurations and control signal output for a given controller 150 of a given LCOM enabled luminaire 100 will depend on a given application and will be apparent in light of this disclosure.

In accordance with some embodiments, a given LCOM enabled luminaire 100 may include an encoder 172. In some embodiments, encoder 172 may be configured, for example, to encode LCOM data in preparation for transmission thereof by the host LCOM enabled luminaire 100. To that end, encoder 172 may be provided with any suitable configuration, as will be apparent in light of this disclosure.

In accordance with some embodiments, a given LCOM enabled luminaire 100 may include a modulator 174. In some embodiments, modulator 174 may be configured, for example, to modulate an LCOM signal in preparation for transmission thereof by the host LCOM enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCOM enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing therethrough, as desired. Other suitable configurations for multiplier 176 will depend on a given application and will be apparent in light of this disclosure.

In accordance with some embodiments, a given LCOM enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing therethrough, as desired. Other suitable configurations for adder 178 will depend on a given application and will be apparent in light of this disclosure.

In accordance with some embodiments, a given LCOM enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCOM enabled luminaire 100 to output an LCOM signal therefrom. Other suitable configurations for DAC 180 will depend on a given application and will be apparent in light of this disclosure.

Figure 3:
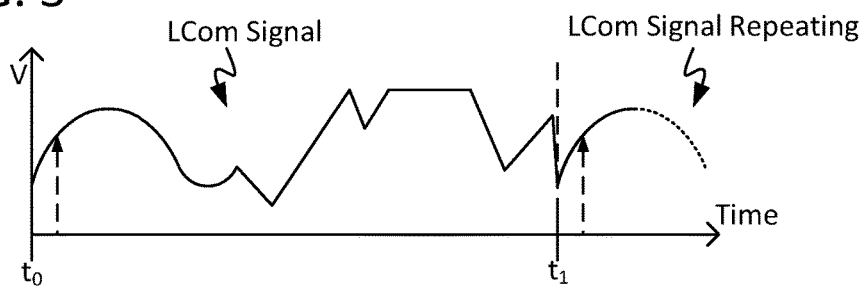
FIG. 3 illustrates an example arbitrary LCOM signal as may be transmitted by an LCOM enabled luminaire, in an embodiment.

As previously noted, a given LCOM enabled luminaire 100 may be configured, in accordance with some embodiments, to output light and/or light encoded with LCOM data (e.g., an LCOM signal). FIG. 3 illustrates an example arbitrary LCOM signal as may be transmitted by an LCOM enabled luminaire 100, in accordance with an embodiment of the present disclosure. As can be seen here, LCOM enabled luminaire 100 may be configured, in accordance with some embodiments, to transmit a given LCOM signal at a given transmission rate over a given time interval ($t_1$-$t_0$). In some cases, a given LCOM enabled luminaire 100 may be configured to repeatedly output its one or more LCOM signals. In any case, the transmission rate may be customized, as desired for a given target application or end-use.

In accordance with some embodiments, a given LCOM enabled luminaire 100 may include one or more sensors 160. In some embodiments, a given LCOM enabled luminaire 100 optionally may include an altimeter 161. When included, altimeter 161 may be configured as typically done, and in some example embodiments may be configured to aid in determining the altitude of a host LCOM enabled luminaire 100 with respect to a given fixed level (e.g., a floor, a wall, the ground, or other surface). In some embodiments, a given LCOM enabled luminaire 100 optionally may include a geomagnetic sensor 163. When included, geomagnetic sensor 163 may be configured as typically done, and in some example embodiments may be configured to determine the orientation and/or movement of a host LCOM enabled luminaire 100 relative to a geomagnetic pole (e.g., geomagnetic north) or other desired heading, which may be customized as desired for a given target application or end-use. In some embodiments, a given LCOM enabled luminaire 100 optionally may include an ambient light sensor 165. When included, ambient light sensor 165 may be configured as typically done, and in some example embodiments may be configured to detect and measure ambient light levels in the surrounding environment of the host LCOM enabled luminaire 100. In some cases, ambient light sensor 165 may be configured to output a signal, for example, to a multiplier 176 of LCOM enabled luminaire 100. In some embodiments, a given LCOM enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCOM enabled luminaire 100. In some embodiments, a given LCOM enabled luminaire 100 optionally may include an accelerometer 169. When included, accelerometer 169 may be configured as typically done, and in some example embodiments may be configured to detect motion of the host LCOM enabled luminaire 100. In any case, a given sensor 160 of a given host LCOM enabled luminaire 100 may include mechanical and/or solid-state componentry, as desired for a given target application or end-use. Also, it should be noted that the present disclosure is not so limited only to these example optional sensors 160, as additional and/or different sensors 160 may be provided, as desired for a given target application or end-use, in accordance with some other embodiments. Numerous configurations will be apparent in light of this disclosure.

In accordance with some embodiments, a given LCOM enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCOM enabled luminaries 100. To that end, communication module 170 may be configured to use any suitable wired and/or wireless transmission technologies (e.g., radio frequency, or RF, transmission; infrared, or IR, light modulation; etc.), as desired for a given target application or end-use. Other suitable configurations for communication module 170 will depend on a given application and will be apparent in light of this disclosure.

Figure 4:
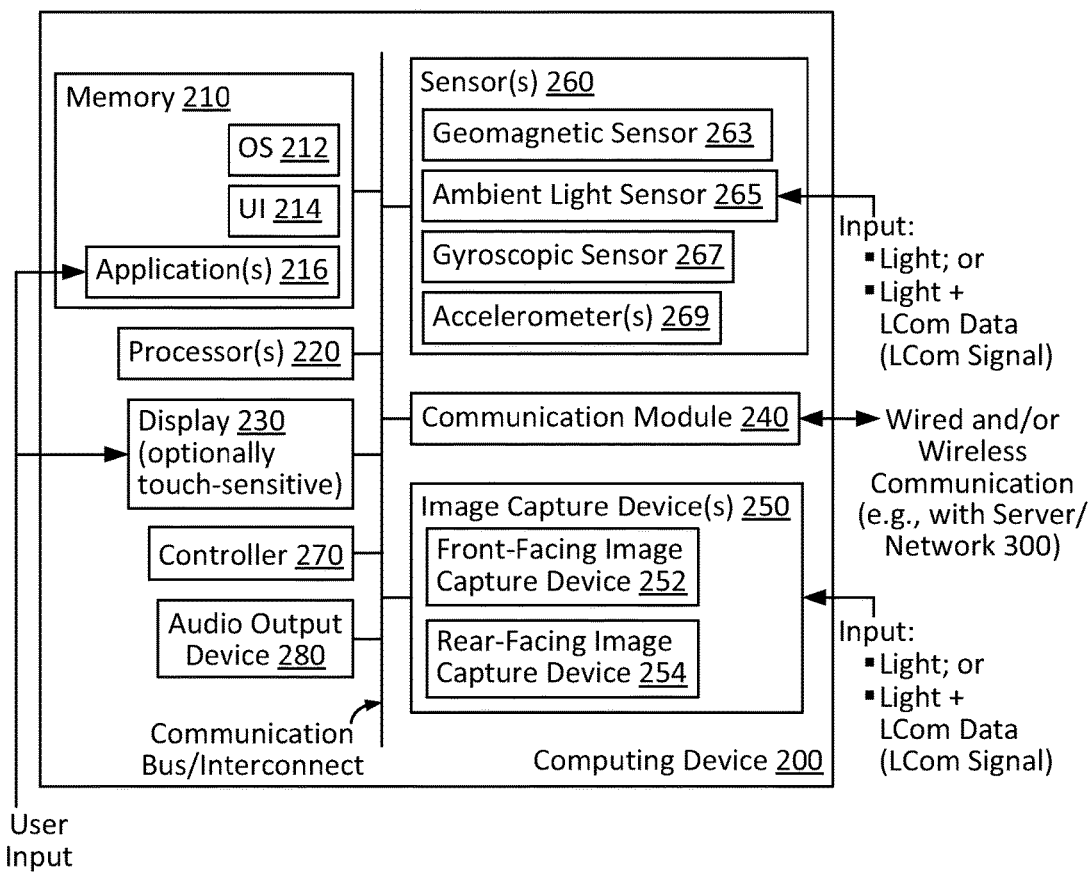
FIG. 4 illustrates an example computing device, in an embodiment.

FIG. 4 illustrates an example computing device 200 configured in accordance with an embodiment of the present disclosure. As discussed herein, computing device 200 may be configured, in accordance with some embodiments: (1) to detect the light pulses of an LCOM signal emitted by a transmitting LCOM enabled luminaire 100; and (2) to decode the LCOM data from a detected LCOM signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis.

The one or more modules stored in memory 210 can be accessed and executed, for example, by the one or more processors 220 of computing device 200. In accordance with some embodiments, a given module of memory 210 can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory 210 can be encoded, for example, on a machine-readable medium that, when executed by a processor 220, carries out the functionality of computing device 200, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 210 (e.g., such as OS 212, UI 214, and/or one or more applications 216, each discussed below) can be implemented in hardware, software, and/or firmware, as desired for a given target application or end-use.

In accordance with some embodiments, memory 210 may include an operating system (OS) 212. OS 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCOM data during its flow through computing device 200. Other suitable configurations and capabilities for OS 212 will depend on a given application and will be apparent in light of this disclosure.

In accordance with some embodiments, computing device 200 may include a user interface (UI) module 214. In some cases, UI 214 can be implemented in memory 210 (e.g., as generally shown in FIG. 4), whereas in some other cases, UI 214 can be implemented in a combination of locations (e.g., at memory 210 and at display 230, discussed below), thereby providing UI 214 with a given degree of functional distributedness. UI 214 may be configured, in accordance with some embodiments, to present a graphical UI (GUI) at display 230 that is configured, for example, to aid in carrying out any of the various LCOM-related techniques discussed herein. Other suitable configurations and capabilities for UI 214 will depend on a given application and will be apparent in light of this disclosure.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). Other suitable modules, applications, and data which may be stored in memory 210 (or may be otherwise accessible to computing device 200) will depend on a given application and will be apparent in light of this disclosure.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means.

In some cases, display 230 optionally may be a touch-screen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given GUI action. In some cases, a touch-sensitive display 230 may facilitate user interaction with computing device 200 via the GUI presented by such display 230. Numerous suitable configurations for display 230 will be apparent in light of this disclosure.

In accordance with some embodiments, computing device 200 may include a communication module 240, which may be configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCOM enabled luminaries 100. In some cases, communication module 240 of computing device 200 and communication module 170 of a given LCOM enabled luminaire 100 may be configured to utilize the same communication protocol. In some cases, communication module 240 may be configured to communicate with a server/network 300 (discussed below). Other suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced.

A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include components such as, for instance, an optics assembly, an image sensor, and/or an image/video encoder, and may be integrated, in part or in whole, with computing device 200. These components (and others, if any) of a given image capture device 250 may be implemented in any combination of hardware, software, and/or firmware, as desired for a given target application or end-use. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCOM signal output of a transmitting LCOM enabled luminaire 100. In some instances, a given image capture device 250 may be, for example, a camera like one typically found in mobile computing devices. Other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous configurations will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional server/network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250 (e.g., front-facing image capture device 252 and/or rear-facing image capture device 254). In some instances, a given controller 270 may be configured to output a control signal to control operation of one or more sensors 260. Other suitable configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Other suitable types and configurations for audio output device 280 will depend on a given application and will be apparent in light of this disclosure.

Server/network 300 can be any suitable public and/or private communications network. For instance, in some cases, server/network 300 may be a private local area network (LAN) operatively coupled to a wide area network (WAN), such as the Internet. In some cases, server/network 300 may include one or more second-generation (2G), third-generation (3G), and/or fourth-generation (4G) mobile communication technologies. In some cases, server/network 300 may include a wireless local area network (WLAN) (e.g., Wi-Fi wireless data communication technologies). In some instances, server/network 300 may include Bluetooth wireless data communication technologies. In some cases, server/network 300 may include supporting infrastructure and/or functionalities, such as a server and a service provider, but such features are not necessary to carry out communication via server/network 300. In some instances, computing device 200 may be configured for communicative coupling, for example, with a server/network 300 and one or more LCOM enabled luminaires 100. In some cases, computing device 200 may be configured to receive data from server/network 300, for example, which serves to supplement LCOM data received by computing device 200 from a given LCOM enabled luminaire 100. In some instances, computing device 200 may be configured to receive data (e.g., such as position, ID, and/or other data pertaining to a given LCOM enabled luminaire 100) from server/network 300 that facilitates indoor navigation via one or more LCOM enabled luminaries 100. In some cases, server/network 300 may include or otherwise have access to one or more lookup tables of data that may be accessed by a computing device 200 communicatively coupled therewith. Numerous configurations for server/network 300 will be apparent in light of this disclosure.

Capturing an LCOM Signal Segment

As presented above, the sampling rates of image capture devices of conventional mobile communications devices generally are not fast enough to meet the Nyquist sampling frequency required for accurate reconstruction of an LCOM signal. In light of this, embodiments of the present disclosure capture different segments of an LCOM signal over at least two repetitions of the signal. This is illustrated in FIG. 5, described below.

Figure 5:
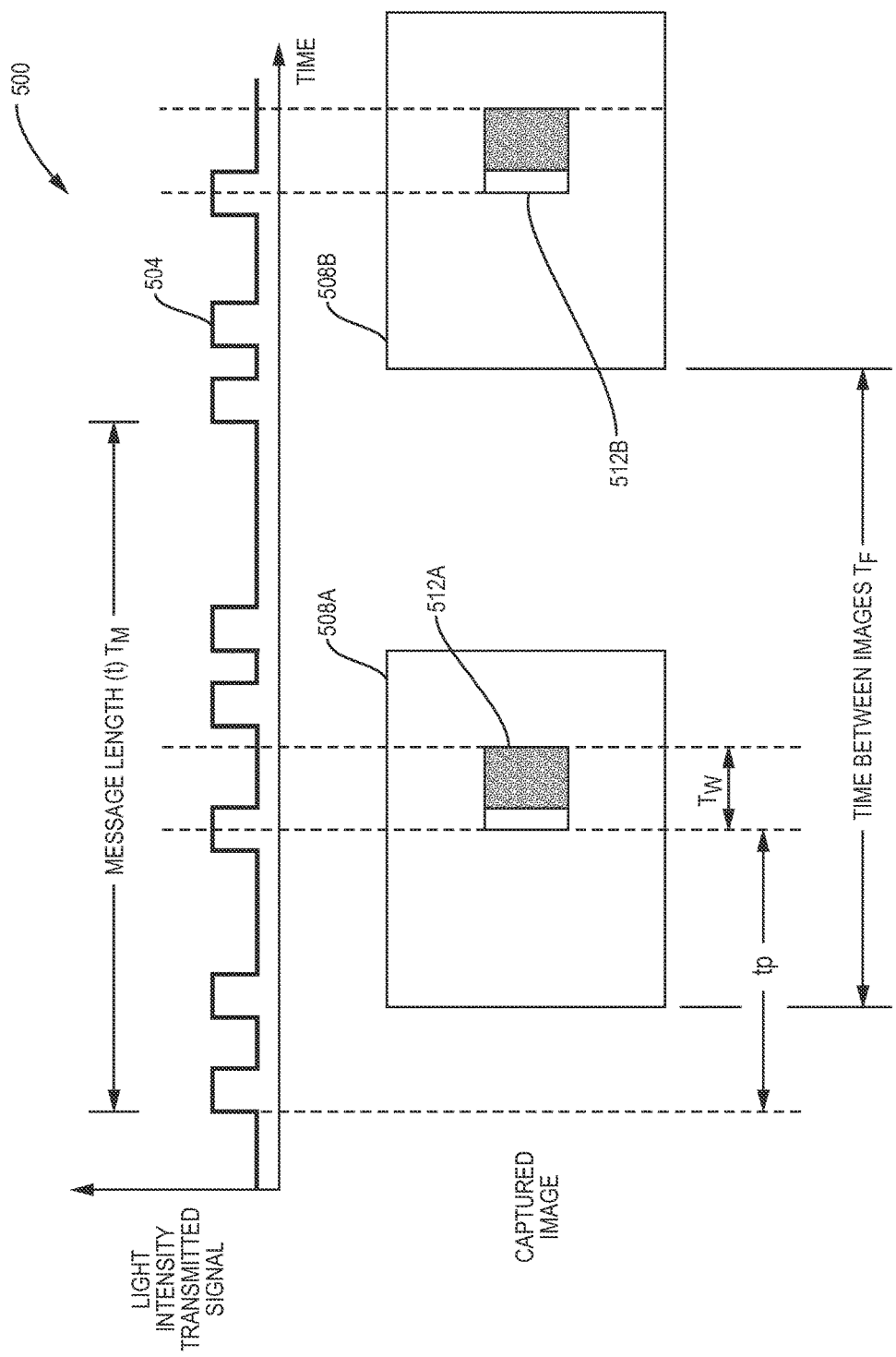
FIG. 5 schematically illustrates capturing a segment of an LCOM signal, in an embodiment.

FIG. 5 schematically illustrates a repeated LCOM signal depicted in graph 500 in terms of light intensity as a function of time. As shown, the repeated signals shown as waveform 504 includes a message length $T_M$ of one repetition (i.e., one "signal"). Below the graph 500 are two captured images 508A and 508B that includes luminaire images 512A and 512B that correspond to segments of the repeated signal. As shown, only a portion of each of the captured images 508A and 508B includes the image of the LCOM enabled luminaire 512A and 512B, respectively.

$T_W$ is used to indicate the duration of time ("sampling window length" or "capture window length") in which the LCOM enabled luminaire is sampled by the image capture device of the mobile communications device. $T_F$ denotes time between the start of image frames and is the reciprocal of the number of frames per second that the image capture device captures per unit time. The minimum value of $T_W$ for accurately capturing data from a luminaire image is equal to the message length $T_M$ divided by the ratio of the time between images $T_F$ (i.e., the time to capture one frame) to the capture window length $T_W$ of the luminaire in the image.

The value $t_p$ shown in FIG. 5 denotes the time between a start location of an LCOM signal and a start location of the luminaire sampling window (e.g., 512A). The duration of the sampling window is denoted by $T_w$.

As shown in FIG. 5, each of captured luminaire images 512A and 512B includes a light portion and a shaded portion. The light portions in each of 512A and 512B correspond to the high intensity components of the segment captured in the images of the LCOM enabled luminaire, and as depicted in the waveform 504. The dark portions in each of 512A and 512B correspond to the low intensity components of the segments captured in the images of the LCOM enabled luminaire, and as depicted in the waveform 504.

Figure 6:
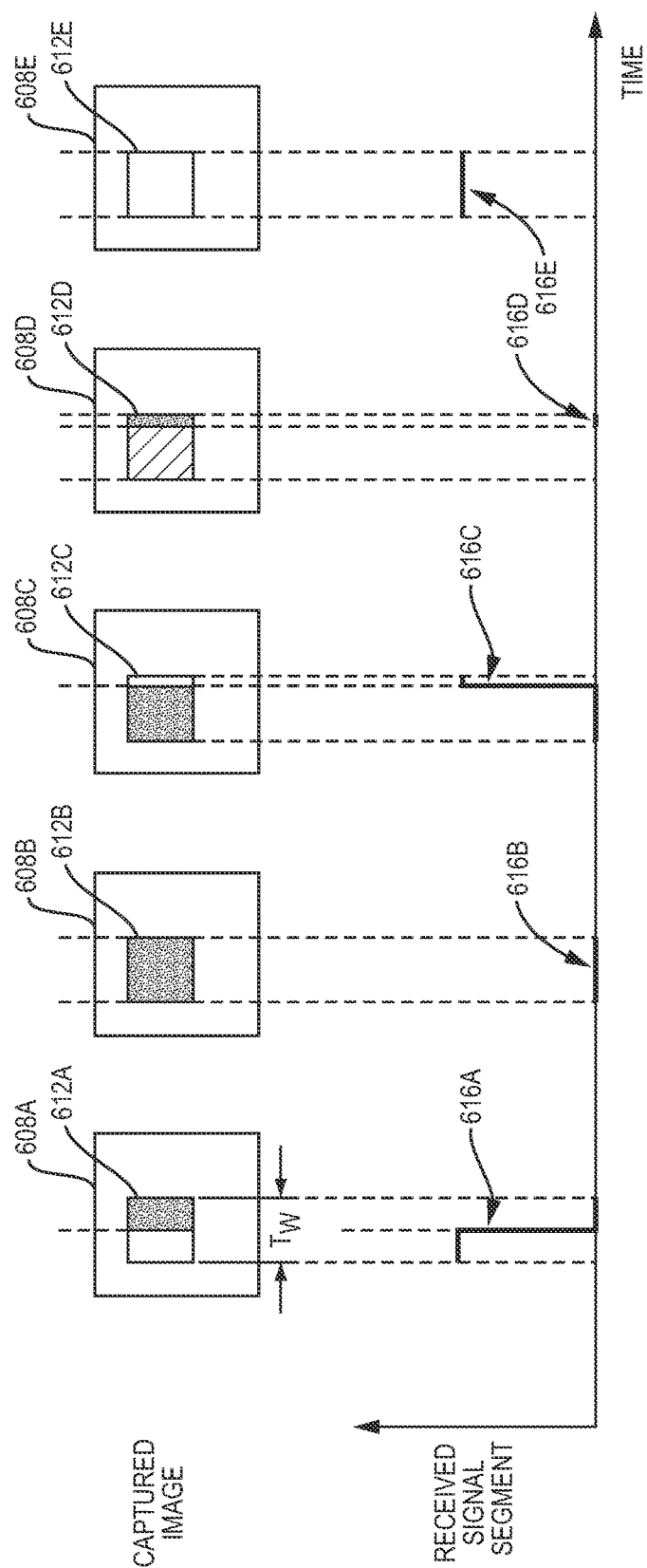
FIG. 6 schematically illustrates the correspondence between various captured images of an LCOM enabled luminaire and corresponding LCOM signal segments, in an embodiment.

FIG. 6 schematically illustrates the correspondence between various captured images of an LCOM enabled luminaire and a corresponding LCOM signal segments, in an embodiment. FIG. 6 includes captured images 608A-E, each of which includes a captured image of an LCOM enabled luminaire 612A-E from which light intensity data is received during $T_W$. The light intensity data in the captured image of each luminaire 612A-E is used to determine a segment of the LCOM signal. These segments are shown as 616A-616E.

For example, the image of LCOM enabled luminaire 612A has approximately equal portions of high intensity light and low intensity light. In some embodiments, the images are captured using a rolling shutter image capture device. In other words, when using a rolling shutter image capture device, a first subset of raster lines of the image capture device captured high intensity light from the LCOM enabled luminaire and a second subset of raster lines occurring after the first subset (but still within the same sampling window $T_W$), captured low intensity light from the same luminaire. The data captured in the image of the LCOM enabled luminaire 612A is decoded into a signal segment 616A that has high and low intensity values and durations corresponding to the received light intensity data shown in sampling window 612. Analogously, the image of LCOM enabled luminaire 612B captured only zero intensity light and correspondingly stored the data as segment 618B. This analysis applies to each of segments 616C, 616D, and 616E.

While FIG. 6 illustrates the capability of capturing a segment of a signal, it does not illustrate steps used to reconstruct the signal as a whole. For the signal to be reconstructed, the captured segments should (1) span an entire transmitted signal (i.e., one repetition of the waveform) and (2) be stored within a ring buffer configured to have a buffer length equal to that of the signal in which each segment is stored at a location in the ring buffer corresponding to the location of the segment within the signal. By placing each captured segment in these locations of the ring buffer, the entire signal will be reconstructed within the ring buffer upon capturing segments from a sufficient number of signal repetitions.

Capturing an Entire Signal Waveform

In one embodiment, to ensure that an entire signal is sampled, and therefore able to be reconstructed in the ring buffer, the location of each captured segment is shifted relative to the last segment captured. Ideally, to minimize the number of samples needed to be captured to fill the ring buffer with the entire signal, each segment is captured one multiple of $T_W$ after the preceding segment has been captured. This "phase shift" between captured segments is expressed below in Equation 1.

$$\Delta t_p = t_{pn+1} - t_{pn} \qquad \text{Equation 1}$$

In Equation 1, is the $\Delta t_p$ "phase shift" denoting the difference in time (or more generally "location") of capture of segments and, as indicated in FIG. 5, $t_{pn}$ is the time between the beginning of a signal "n" and the start of an image sampling window $T_W$. Similarly, $t_{pn+1}$ is the time between the beginning of a subsequent signal "n+1" and the start of an image sampling window $T_W$. In one embodiment, $\Delta t_p$ is an integer multiple of $T_W$ so that the number of sampling windows is minimized. However, this need not be the case as long as $\Delta t_p$ is not equal to 0 or 1, which would merely sample the same segment of a signal as the preceding sampling window. Also, values of $\Delta t_p = (1/N) T_M$ where N is an integer are also preferably avoided.

The image capture device may also adjust its frame rate to capture, in proper sequence, each segment of the signal so that the entire signal is reconstructed. That is, the image capture device will sequentially capture the segments of the signal if the frame rate is adjusted according to Equation 2.

$$T_F = T_M + T_W \qquad \text{Equation 2}$$

In this embodiment, the entire signal would be sampled in $T_M/T_W$ number of frames.

However, in some embodiments the various segments of a signal are not captured in sequential order as described above. This is illustrated in FIG. 7. In FIG. 7, captured and stored segments 616A-E are stored, but which do not form the entire signal. Rather, segments 704 and 708, on either side of segment 616D, must still be captured and stored in corresponding locations within the configured ring buffer to complete the signal.

In these embodiments, using the PLL to synchronize the buffer storage locations to the received signal, each captured segment is stored in an appropriate buffer storage location. As in the above example, the sampling period must be configured to sample the entire signal. If the sampling period remains constant or is indexed in integer multiples of the signal wavelength, then the same segments of the waveform will be captured.

To ensure the entire waveform is sampled, the number of repetitions needed to sample the entire signal is determined, and the mobile communications device determines a frame rate by which to accomplish this. The relationships applied to this embodiment are presented below in Equations 2 and 3.

$$R = \text{Sampling Period/Signal Period} \qquad \text{Equation 2}$$

where the sampling period is the reciprocal of the frame rate of the image receiver of the mobile communication device and the signal period is the reciprocal of the LCOM signal frequency. The number of signal repetitions needed N to fill the buffer, thus assembling a completed signal is presented below in Equation 3.

$$N = \text{Floor}(R) * (1/(R - \text{Floor}(R))) \qquad \text{Equation 3}$$

The "Floor" function is a function that rounds down a number. Applying these equations to an example, assuming a mobile communications device adjusts its frame rate to that the sampling period is 91% of the signal period i.e., R=1.1, then N=10. That is, at a frame rate corresponding to a sampling period that is 91% of the message period, 10 signal repetitions are needed to sample segments sufficient to fill the entire buffer.

In some embodiments, a luminaire may alter its signal period. This requires communication from a mobile communications device to a luminaire regarding its sampling period and subsequent adjustment by the luminaire of its communications protocol. This may be inconvenient in settings where many different devices are in communication with a given luminaire.

The mobile communication device checks periodically for whether the configured ring buffer is full, and therefore, whether the entire signal has been captured. This can be accomplished by periodically attempting to decode the stored signal. If the decoding is successful, then the entire signal has been stored in the buffer. If the decoding is not successful, then either the buffer is not full or the stored segments are corrupted (i.e., stored in improper locations that do not correspond to the segment locations within the signal).

Ring Buffer Configuration

As presented above, embodiments of the present disclosure store each segment of the LCOM signal in a corresponding location within a ring buffer that is instantiated in configurable volatile memory. As a first step in this process, the length of the LCOM signal is identified and the ring buffer configured to match the length of the signal. The length of the LCOM signal is identified in any of several ways. In one example, the LCOM signal transmits or is preceded metadata that provides the signal length (whether measured in bits, units of time, or other unit of measure). This metadata can be decoded by the mobile communications device (or a system in communication with the mobile communications device), which then can configure the ring buffer accordingly. In another example, the mobile communications device can measure the signal length and configure the ring buffer accordingly. In one embodiment, the signal length is measured by identifying intensity values known to precede and follow one repetition of a signal, thus providing the signal length or otherwise decoding delimiters in the transmitted light intensity data indicating a start and finish of the message. In any of these embodiments, a phase locked loop circuit is optionally used to tune a clock of the mobile communication device and otherwise tune the ring buffer to exactly correspond to the length of the transmitted signal.

Example Method

FIG. 8 is a method flow diagram of a method 800 for reconstructing light-based communication signals captured with a rolling shutter image capture device, in an embodiment. As described above, the signal length of the light-based communication signal 804 is determined. A buffer, for example a ring buffer, is configured 808 to have a length matching the determined signal length. A plurality of signal segments is captured 812 from at least two repetitions of the light-based communication signal. Upon capturing each segment, a storage location in the ring buffer is identified 816 corresponding to the location of the segment in the signal. Each segment is stored 820 in its corresponding location. The buffer is checked 824 to see if all storage locations are full, thereby indicated that the complete signal has been captured. Optionally, if the buffer is not full, the missing segments are captured 828. Once the buffer is full and the entire signal is reconstructed, the signal is decoded 832 and the message encoded in the signal is presented to the user.

Example

In an example of the present disclosure a method for reconstructing light-based communication signals is described. The method includes determining a signal length of a light-based communication signal, configuring a buffer to match the determined signal length, capturing a plurality of segments of the light-based communication signal from at least two repetitions of the light-based communication signal, identifying, upon capturing each segment of the plurality of segments of the light-based communication signal, a location of each segment within the signal, and storing each captured segment of the plurality at a storage location of the buffer corresponding to the location of each segment within the signal. In one example of the method, the determining the signal length of a light-based communication signal includes decoding a metadata header that includes the signal length. In one example of the method, the determining the signal length of a light-based communication signal includes identifying a starting location and an ending location of the light-based communication signal and determining the message length based on the identified starting location and ending location of the light-based communication signal. The example method also includes indexing the configured buffer to include storage locations corresponding to locations within the light-based communication signal. The capturing of the plurality of segments of the example method also includes adjusting a capture frequency to sequentially capture the light-based communication signal in a number of frames equal to a ratio of a signal length divided by a capture window length. Capturing the plurality of segments is performed using a rolling shutter image capture device in one embodiment. Also in one embodiment, the buffer is a ring buffer. The above example method may also be instantiated in a computer program product wherein the computer program product is stored on one or more non-transitory computer-readable mediums that include instructions that, when executed by one or more processors, cause the method to be carried out. The non-transitory computer readable medium(s) may include, for example, one or more machine readable mediums, such as a hard disk, ROM, solid state drive, thumb drive, embedded controller memory, compact disc, server computer, or other such non-transitory mediums that can be accessed by one or more processors so that the instructions thereon can be executed to carry out the process. Note that the process so encoded on the computer readable medium(s) need not be carried out, and may remain unexecuted in some such embodiments.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes.

What is claimed is:

1. A method for reconstructing light-based communication signals, the method comprising:
   determining a signal length of a light-based communication signal;
   configuring a buffer to match the determined signal length;
   capturing a plurality of segments of the light-based communication signal from at least two repetitions of the light-based communication signal by adjusting a capture frequency to sequentially capture the light-based communication signal in a number of frames equal to a ratio of the determined signal length divided by a capture window length;
   identifying, upon capturing each segment of the plurality of segments of the light-based communication signal, a location of each segment within the light-based communication signal; and storing each captured segment of the plurality of segments at a storage location of the buffer corresponding to the location of each segment within the light-based communication signal.

2. The method of claim 1, wherein determining the signal length of the light-based communication signal comprises decoding a metadata header that includes the signal length.

3. The method of claim 1, wherein determining the signal length of the light-based communication signal comprises:
   identifying a starting location and an ending location of the light-based communication signal; and
   determining the signal length based on the identified starting location and ending location of the light-based communication signal.

4. The method of claim 1, further comprising indexing the configured buffer to include storage locations corresponding to locations within the light-based communication signal.

5. The method of claim 1, wherein capturing the plurality of segments is performed using a rolling shutter image capture device.

6. The method of claim 1, wherein the buffer is a ring buffer.

7. A computer program product wherein the computer program product is stored on at least one non-transitory computer-readable medium that includes instructions that, when loaded into memory, cause at least one processor to perform a method, the method comprising:
   determining a signal length of a light-based communication signal;
   configuring a buffer to match the determined signal length;
   capturing a plurality of segments of the light-based communication signal from at least two repetitions of the light-based communication signal by adjusting a capture frequency to sequentially capture the light-based communication signal in a number of frames equal to a ratio of the determined signal length divided by a capture window length;
   identifying, upon capturing each segment of the plurality of segments of the light-based communication signal, a location of each segment within the light-based communication signal; and
   storing each captured segment of the plurality of segments at a storage location of the buffer corresponding to the location of each segment within the light-based communication signal.

8. The method of claim 7, wherein determining the signal length of the light-based communication signal comprises decoding a metadata header that includes the signal length.

9. The method of claim 7, wherein determining the signal length of the light-based communication signal comprises:
   identifying a starting location and an ending location of the light-based communication signal; and
   determining the signal length based on the identified starting location and ending location of the light-based communication signal.

10. The method of claim 7, further comprising indexing the configured buffer to include storage locations corresponding to locations within the light-based communication signal.

11. The method of claim 7, wherein capturing the plurality of segments is performed using a rolling shutter image capture device.

12. The method of claim 7, wherein the buffer is a ring buffer.

* * * * *